United States Patent
Billet et al.

(10) Patent No.: US 9,154,295 B2
(45) Date of Patent: Oct. 6, 2015

(54) METHOD OF GENERATING A CORRESPONDENCE TABLE FOR A CRYPTOGRAPHIC WHITE BOX

(75) Inventors: Olivier Billet, Tourrettes sur Loup (FR); Gilles Macario-Rat, Vanves (FR)

(73) Assignee: KONINKLIJKE PHILPS N.V., Eindhoven (NL)

( * ) Notice: Subject to any disclaimer, the term of this patent is extended or adjusted under 35 U.S.C. 154(b) by 0 days.

(21) Appl. No.: 13/519,378

(22) PCT Filed: Dec. 28, 2010

(86) PCT No.: PCT/FR2010/052931
§ 371 (c)(1),
(2), (4) Date: Jun. 27, 2012

(87) PCT Pub. No.: WO2011/080487
PCT Pub. Date: Jul. 7, 2011

(65) Prior Publication Data
US 2012/0300922 A1    Nov. 29, 2012

(30) Foreign Application Priority Data
Dec. 30, 2009   (FR) ..................................... 09 59679

(51) Int. Cl.
| | |
|---|---|
| *H04L 9/00* | (2006.01) |
| *H04K 1/00* | (2006.01) |
| *H04L 29/06* | (2006.01) |
| *H04L 9/06* | (2006.01) |
| *H04L 9/08* | (2006.01) |
| *H04L 9/18* | (2006.01) |

(52) U.S. Cl.
CPC .................. *H04L 9/0618* (2013.01); *H04L 9/00* (2013.01); *H04L 9/06* (2013.01); *H04L 9/08* (2013.01); *H04L 9/18* (2013.01); *H04L 63/0428* (2013.01); *H04L 2209/125* (2013.01); *H04L 2209/16* (2013.01)

(58) Field of Classification Search
CPC ............... H04L 9/18; H04L 9/06; H04L 9/00; H04L 9/08; H04L 63/0428
USPC .................................... 380/28, 262; 713/150
See application file for complete search history.

(56) References Cited

U.S. PATENT DOCUMENTS

| | | |
|---|---|---|
| 2005/0259814 A1 | 11/2005 | Gebotys |
| 2007/0088949 A1* | 4/2007 | England et al. ................ 713/167 |
| 2007/0140478 A1 | 6/2007 | Komano et al. |

(Continued)

FOREIGN PATENT DOCUMENTS

| | | |
|---|---|---|
| EP | 1 615 098 A2 | 1/2006 |
| EP | 1 833 190 A1 | 9/2007 |

(Continued)

*Primary Examiner* — Aravind Moorthy (57) ABSTRACT

A method is provided for generating a correspondence table suitable for use in a cryptographic processing method and comprising storing a plurality of input data and of output data in the table, each input datum being associated with at least one output datum in the table. For each input datum, at least one of the output data is obtained by applying a coding function to a first subsidiary datum and to an encrypted intermediate datum depending on the input datum. Also provided are a corresponding encryption method, a storage unit suitable for storing the correspondence table generated by the above generation method, a device for physically implementing such a correspondence table, a decryption device including such a storage unit, and a computer program product suitable for implementing the above generation method.

19 Claims, 8 Drawing Sheets

(56) References Cited

U.S. PATENT DOCUMENTS

2010/0054461 A1* 3/2010 Ciet et al. .................. 380/29
2011/0055591 A1 3/2011 Rivain et al.

FOREIGN PATENT DOCUMENTS

| WO | WO 03/017067 A2 | 2/2003 |
| WO | WO 2009/074726 A1 | 6/2009 |

* cited by examiner

METHOD OF GENERATING A CORRESPONDENCE TABLE FOR A CRYPTOGRAPHIC WHITE BOX

CROSS-REFERENCE TO RELATED APPLICATIONS

This application is the U.S. national phase of the International Patent Application No. PCT/FR2010/052931 filed Dec. 28, 2010, which claims the benefit of French Application No. 09 59679 filed Dec. 30, 2009, the entire content of which is incorporated herein by reference.

FIELD

The present invention relates to the field of cryptography, in particular as applies to distributing multimedia contents.

BACKGROUND

With the arrival of digital technology and communications networks, the distribution of audiovisual contents can take place in multiple forms and in novel distribution contexts that used not to exist.

The massive distribution of such contents raises the problem of protecting those contents: although they are now easy to distribute, they are also relatively easy to copy, rapidly and massively.

In order to protect such contents, the technical utilization of cryptography has become widespread with some degree of success. An application of cryptography lies in making transactions between two or more entities secure, by applying a cryptographic task. Such cryptographic tasks include encrypting messages, electronic signatures, or indeed authenticating messages. One encryption method consists essentially in encrypting a message so that only a legitimate destination can decrypt it using software and cryptographic equipment that the user has obtained legally.

The problem with such an encryption technique is that the legitimate user possessing the decryption software may attempt to understand how the software works by performing various so-called "reverse engineering" operations.

Such reverse engineering operations seek to identify the algorithms used in the software, or indeed to recover the keys or the cryptographic secrets that are distributed to the legitimate user and that are used by the decryption software.

Identifying the algorithms and recovering the massively-distributed keys or cryptographic secrets for the purpose of obtaining the cryptographic methods used for encryption thus destroys the efforts made at achieving protection.

In order to combat this reverse-engineering threat to cryptographic algorithms incorporated in consumer software for rendering multimedia contents, proposals have been made for a new cryptographic attack model known as a "white box attack" and for a strategy for protecting the model in the article "A white-box DES implementation for DRM applications" by Chow et al. The cryptographic algorithms described in that article are constituted by affine applications and by non-linear applications using a very small number of variables in the form of stored tables. It thus becomes much more difficult to identify the cryptographic algorithm used, and it is possible to hide certain steps and/or values during the execution of the decryption algorithm.

In particular, variables that pass between the various tables and that are observable to a user, which variables correspond to transition variables between the various individual operations of the cryptographic algorithm for decryption, are themselves coded by a secret coding function. Thus, since the values that can be observed are not directly the values that are used for the individual cryptographic operations, but coded versions of them, reverse engineering is made more difficult.

Nevertheless, cryptanalysts have succeeded in overcoming that protection strategy, as set out in the article "Cryptanalysis of a white box AES implementation" by Billet et al. It has thus been shown that that strategy does not satisfy the intended security objectives, in particular because the protection of the transition variables that are observable by an attacker is not sufficient.

SUMMARY

An object of the present invention is thus to improve the situation.

To this end, the present invention provides a method of generating a correspondence table usable in a cryptographic processing method and comprising storing a plurality of input data and of output data in the table, each said input datum being associated with at least one said output datum in the table, the method comprising, for each said input datum, obtaining at least one said output datum by applying a coding function to a first subsidiary datum and to an encrypted intermediate datum depending on the input datum.

Thus, the method of the invention proposes a cryptographic solution that is better at withstanding reverse engineering than the above-mentioned white box strategy, and it enables such white box cryptographic algorithms to be protected better.

The encrypted intermediate datum is advantageously obtained by applying a cryptographic function to the input datum, thus making it possible to protect said cryptographic function from being deduced by reverse engineering.

In a preferred implementation, for each input datum, a plurality of first subsidiary data are generated and a plurality of output data are obtained, for each said first generated subsidiary datum, by applying a coding function to said first subsidiary datum and to the encrypted intermediate datum. This serves to strengthen the protection of the cryptographic function by avoiding having any one-to-one relationship in the correspondence table. By using these intermediate data, it is possible to watermark the decryption method either for the sender, or for the receiver, or for the content. Thus, if the subsidiary data are selected in a manner that is known to the sender device that implements the encryption software, it is then possible to watermark a content in personalized manner as a function of an identity that may be the identity associated with the sender device, e.g. the identity of the holder of the rights associated with the content, or the identity associated with a receiver device, e.g. the identity of a person who has acquired rights over the content that is transmitted to that person in encrypted form. Furthermore, it is possible to incorporate decoy data within said subsidiary data, which decoy data may serve subsequently for detecting abnormal utilization of the decryption device. For example, such decoy data may be used to detect that an ill-intentioned person is attempting reverse engineering on the decryption device, so that the device then takes on a defensive mode, making it impossible to carry through the reverse engineering action. In another example, such decoy data may be used for causing the device that receives the data for decryption to adopt behavior that is remotely controlled from the sender device. The receiver device may then be caused to reveal its identity. This provides a possibility of tracking cheats.

Advantageously, for each input datum, a plurality of distinct second subsidiary data are generated and a plurality of coded input data are obtained by applying, for each of said generated second subsidiary data, a coding function to said second subsidiary datum and to the input datum. This also serves to strengthen the protection of the cryptographic function by avoiding giving direct access to the input data via the correspondence table.

Preferably, the first subsidiary data and/or the second subsidiary data are generated randomly, thereby strengthening the protection of the cryptographic function.

In another advantageous implementation, the input datum is obtained by applying a preliminary function to a precoded input datum, thereby making the cryptographic function used less vulnerable to a reverse engineering technique.

Preferably, when the input datum is obtained by prior application of a prior coding function to at least one initial input datum, the preliminary function applied to the input datum is a decoding function corresponding to said prior coding function. It is then possible to protect a succession of partial encryption functions in a cryptographic white box, by allowing only encoded transition variables to be observed.

The present invention also provides a method of generating a plurality of correspondence tables and comprising initially generating a first correspondence table by means of the above generation method in which the cryptographic function is applied directly to at least one initial input datum, followed by generating a succession of correspondence tables by means of the above generation method.

In a preferred implementation of the above method of generating a plurality of tables, the method includes a final step of generating a last correspondence table having a plurality of input data stored therein, each associated with a plurality of output data, each said output datum being obtained by applying a cryptographic function to an intermediate datum obtained by application to the associated input datum of a decoding function corresponding to the coding function used while generating the last table generated during the above method.

The invention also provides a method of encrypting an input datum into an output datum, the output datum being obtained by applying a coding function to a first subsidiary datum and to an encrypted intermediate datum obtained by applying a cryptographic function to the input datum.

Advantageously, the encryption method includes a prior step of storing a plurality of subsidiary data used for generating at least one correspondence table, the first subsidiary datum being selected randomly from said plurality of subsidiary data, thereby decrypting the encrypted datum by means of the generated correspondence table. The data as encrypted in this way can be decrypted effectively only on a decryption device that includes such a correspondence table.

The present invention also provides a storage unit comprising at least one storage means having stored therein a first plurality of input data and a second plurality of output data. For each storage means, each input datum is associated with at least one said output datum in a correspondence table generated by means of the above generation method.

The present invention also provides a physical device for implementing a cryptographic correspondence table, the device comprising a data processor unit connected to a programmer unit suitable for receiving at least one memory means, the processor unit being arranged to generate from a plurality of input data at least one cryptographic correspondence table by means of the above method, the programmer unit being arranged to store said correspondence table in the storage means.

The present invention also provides a device for decrypting an encrypted datum and comprising the above storage unit, and a processor module connected to each of the storage means of the storage unit, said processor unit being arranged to read a first input datum associated with the data for decrypting from the storage means in which the last-generated table is stored and for reading the tables stored successively in the storage means successively in the opposite order to the order in which they were generated, to obtain an input datum associated with the output datum corresponding to the input datum read from the previously-read storage means.

The user of such a decryption device can observe only encoded transition variables without being able to deduce therefrom any partial decryption steps as implemented in succession in the storage means.

Finally, the present invention provides a computer program product stored on a storage medium for execution by a processor unit and enabling the above generation method to be implemented in order to obtain at least one cryptographic correspondence table.

BRIEF DESCRIPTION OF THE DRAWINGS

Other details and advantages of the invention can be better understood from the following implementations described with reference to the accompanying drawings, in which.

DETAILED DESCRIPTION

Figure 1A:
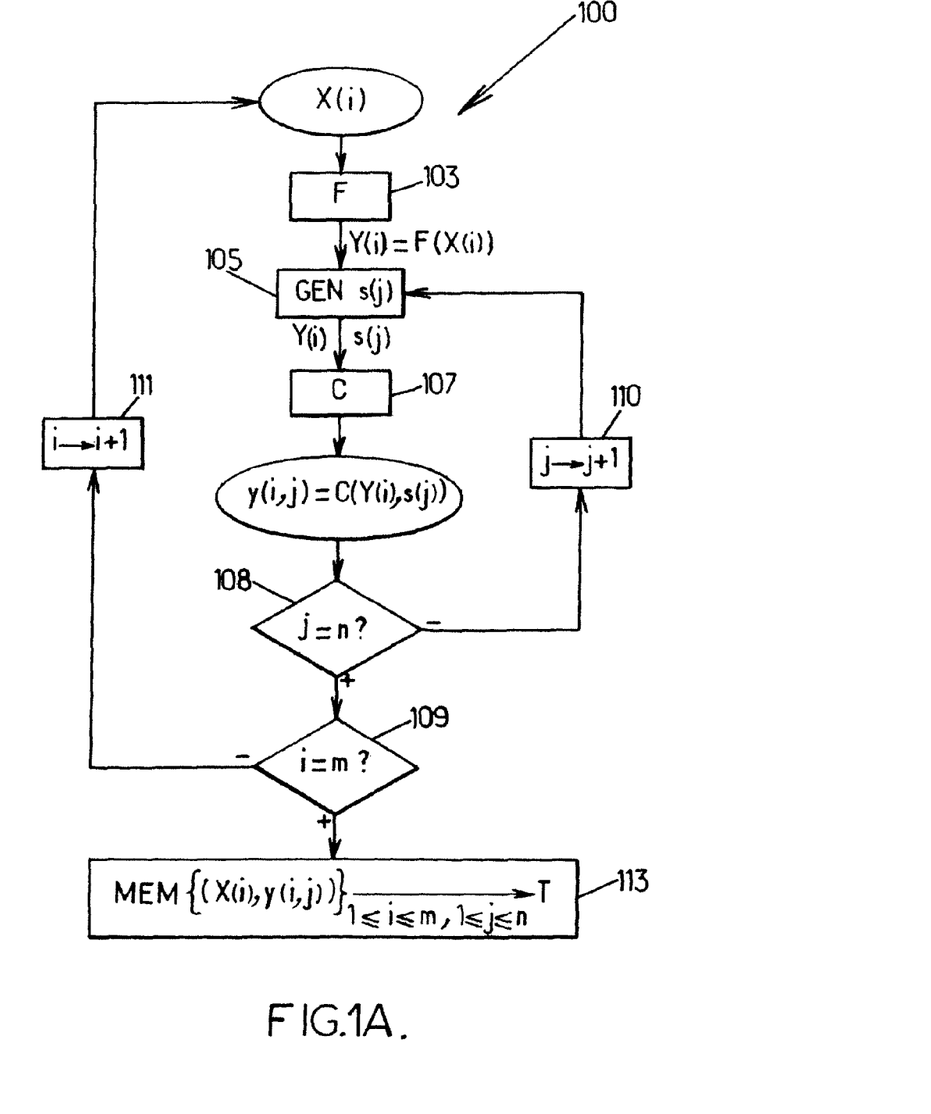
FIG. 1A shows a method of generating a correspondence table in accordance with the present invention.

Reference is made to FIG. 1A which shows a method 100 generating a correspondence table in accordance with the present invention.

The method consists in storing in a correspondence table T, for each input datum $X(i)$ taken from a certain number m (where m is an integer greater than 1) of input data $X(1), \ldots, X(i), \ldots, X(m)$, a certain number n of output data $y(i,j)$, where n is an integer greater than or equal to 1. The correspondence table T as generated in this way then contains n*m coded data pairs $(X(i), y(i,j))$ and may be stored in storage means of the non-rewritable read only memory (ROM) type. By way of example, the data $X(i)$ and $y(i,j)$ may be in binary form or in any other form suitable for storing simply in conventional storage means.

FIG. 1A shows the calculation that serves, for an input datum $X(i)$, to obtain the corresponding output data $y(i,j)$. In order to obtain the complete correspondence table, it suffices to reproduce this calculation n times, for each possible input datum X(i), as represented by the recursive loop formed by the end-of-loop verification step 109 and the step 111 of incrementing the variable i. Once the output data y(i,j) corresponding to each input datum X(i) has been calculated for all of the input data X(i), the correspondence table T may be stored in storage means during a storage step 113.

In particular, for each input datum X(i), at least one associated output datum y(i,j) is obtained during coding step 107 by applying a coding function C to two distinct data: the coding function C is applied to a first subsidiary datum s(j) generated during a generation step 105 and to an encrypted intermediate datum Y(i) that depends on the input datum X(i).

The presence of a first subsidiary datum s(j) in the coding of the intermediate datum Y(i) makes it possible to prevent a user performing reverse engineering to recover the variables used during the encryption steps preceding the coding, and thus deducing directly therefrom the type of encryption function used.

The encrypted intermediate data Y(i) is advantageously obtained during an encryption step 103 by applying a cryptographic function F to the input datum X(i). Such a cryptographic function may correspond to any type of operation, such as for example an arithmetic operation such as addition, multiplication, raising to a power, or indeed an arbitrary permutation.

By applying the coding function C to the encrypted intermediate datum Y(i) and also to the subsidiary datum s(j), the cryptographic function F that is being used is "protected" and cannot be deduced by a user having access only to the input data X(i) and the output data y(i,j).

In order to be able to deduce the cryptographic function F, the user needs to know not only the datum to which the function F is applied directly, but also the datum that results directly from the application of said function F.

Thus, even if a user knowing the input datum X(i) has access to the datum to which the cryptographic function F is applied directly, that user cannot access the encrypted intermediate datum Y(i) that results directly from the application of said function F, since it is masked by the coding function C.

Such a first subsidiary datum s(j) may be generated during a generation step 105 by a random process, thereby strengthening the ability of the method to withstand an ill-intentioned user. From a point of view of ease of technical implementation, it may be advantageous to use a pseudo-random process for generating this subsidiary datum s(j).

In a preferred implementation, the various subsidiary data s(j) generated for a given input datum X(i) are generated during the step 105 in such a manner as to be distinct from one another so as to further strengthen the protection of the encryption function F. In a variant, this first subsidiary datum may be generated during the step 105 as a function of the input datum X(i), in the manner explained below.

These operations of generating a first subsidiary datum s(j) and of coding a corresponding output datum y(i,j) such that y(i,j)=C(Y(i),s(j)) are repeated for each input datum X(i), preferably n times, so as to obtain n output data y(i,j), with j varying over the range 1 to n, for each input datum X(i). This is symbolized in FIG. 1A by the recursive loop formed by the end-of-loop verification step 108 and the step 110 of incrementing the variable j.

Once both recursive loops have terminated, a set of data pairs $\{(X(i),y(i,j),y(i,j))\}_{1\leq i\leq m,\ 1\leq j\leq n}$ is available that can be stored during the storage step 113 in the form of a correspondence table T in appropriate storage means.

Figure 1B:
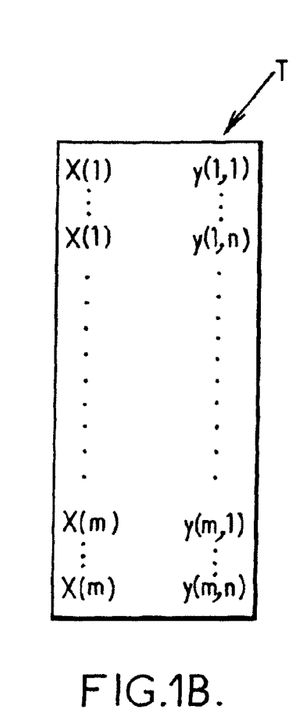
FIG. 1B shows the correspondence table generated by the generation method of the present invention.

The correspondence table generated by the above generation method is shown in FIG. 1B.

In FIG. 1B, the correspondence table T is in the form of two columns and n*m rows, the first column comprising the input data X(i) and the second column comprising the encoded output data y(i,j) associated with said input data X(i). The data may be classified, e.g. by incrementing the first variable i, thereby enabling the data pairs (X(i),y(i,j)) to be grouped in a manner that increases as a function of the input datum X(i) used for generating the output data y(i,j), as shown in FIG. 1B.

In FIG. 1B, it can clearly be seen that a given input datum X(i) corresponds to a certain number of output data y(i,j) that are generated as a function of subsidiary data s(j). The use of a correspondence table T in a user device makes it possible, starting from an output datum y(i,j) transmitted by a distribution server, to obtain directly a decrypted input datum X(i) without giving any information about the encryption function used, and without leaving the user with any possibility of obtaining such information.

Such a correspondence table T constitutes a black box in the sense that for a specific output datum y(i,j) supplied by the user, the table T returns only one corresponding input datum X(i), and vice versa, without giving any information about the manner in which the output datum y(i,j) was calculated.

In a variant, if arrangements are made for the values of X(i) to be values lying in the range 1 to m, it is possible to omit the first column, since implicitly, it is possible to deduce the value of X(i) from the row number.

Figure 1C:
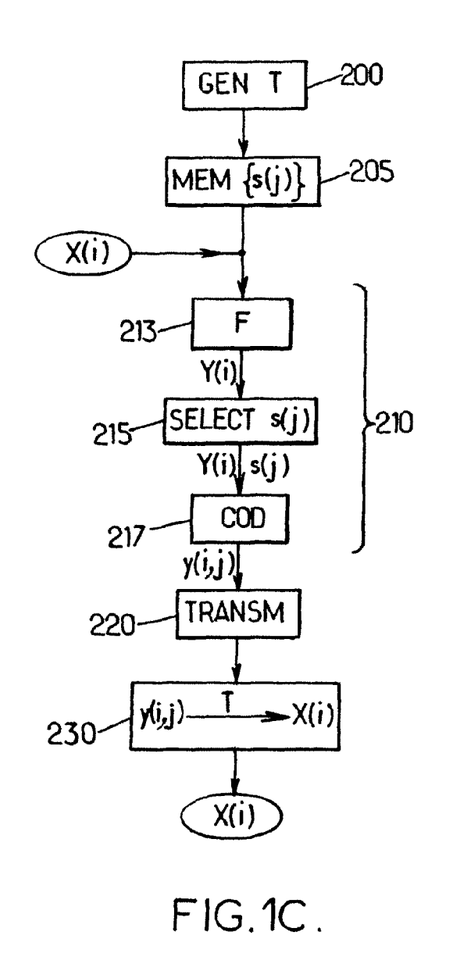
FIG. 1C shows the steps of encrypting and decrypting making use of the correspondence table generated by the generation method of the present invention.

FIG. 1C shows the encryption and decryption methods using the correspondence table generated by the first implementation of the generation method of the present invention.

A datum X(i) for transmission, e.g. a binary data block of a movie to be transmitted from a distribution server to one or more users having a decryption device with a correspondence table T generated by the above generation method, is initially encrypted by the encryption method 210 so as to produce an output datum Y(i,j).

To do this, the encryption function F used while generating the correspondence table T is initially applied to the datum X(i) during a first encryption step 213, so as to obtain an encrypted input datum Y(i).

Thereafter, during a generation step 215, a subsidiary datum s(i) is generated that corresponds to one of the subsidiary data s(j) used during generation of the correspondence table T. By way of example, this generation step 215 may be implemented by randomly selecting one subsidiary datum from the set of subsidiary data s(j) stored during a storage step 205, which subsidiary data s(j) were used while generating the correspondence table T during a generation step 200 similar to the above-described step 100.

Finally, during a coding step 217, the coding function C used while generating the correspondence table T is applied to the encrypted input data Y(i) and to the generated subsidiary data s(j) in order to obtain an output datum y(i,j).

By using the encryption and coding functions F and C that were used for generating the correspondence table T, and by generating a subsidiary datum s(j) that was used while generating the same correspondence table T, the output datum y(i,j) that is obtained corresponds to one of the output data stored in that table T.

The resulting output datum y(i,j) is then transmitted to the user(s) in question during a transmission step 220 that may take place via conventional wired or wireless transmission means.

Once this output datum y(i,j) has been received by the device of a user it is then decrypted during a decryption step 230. This decryption step 230 consists: in using the correspondence table T generated by the above-described method, using the same functions F and C as those used while preparing the datum y(i,j); and in searching the table T for the input datum X(i) associated with the received output datum y(i,j). This input datum X(i) then corresponds to the decrypted datum X(i) and encrypted transmission of the data X(i) has thus been performed correctly.

Figure 2A:
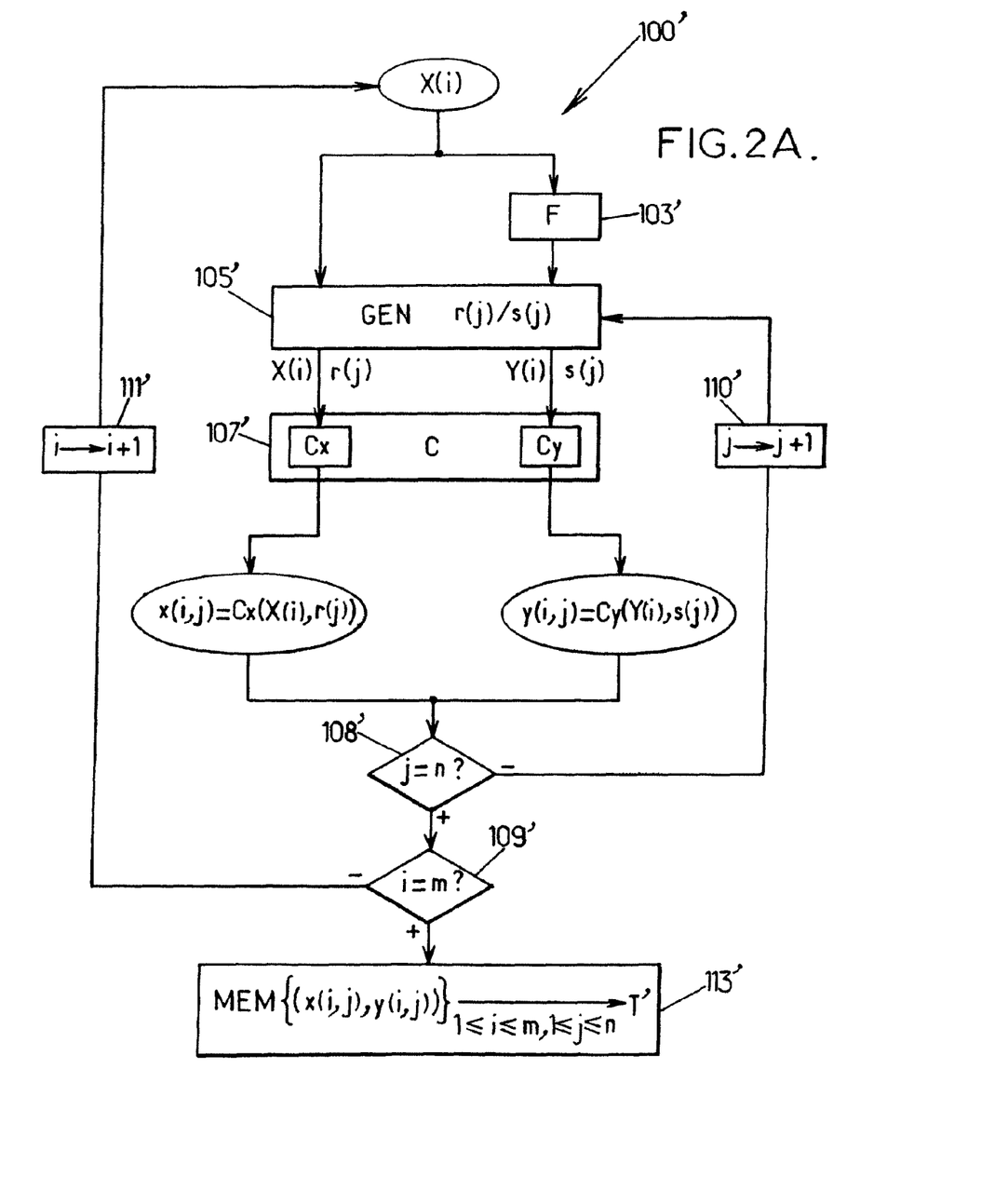
FIG. 2A shows a first implementation of the generation method of the present invention.

Reference is made below to FIG. 2A which shows a first implementation of the generation method of the present invention.

The steps of the method 100' shown in this figure correspond to the steps of the method 100 shown in FIG. 1A with the exception that the coding function Cy is employed to code the encrypted input datum Y(i) as a function of each first subsidiary datum s(j), such that y(i,j)=Cy(Y(i),s(j)).

The generation step 105' also includes generating a second subsidiary datum r(j) for each value of the variable j that is incremented as a function of the variable i. It is then possible to obtain a coded input datum x(i,j) from the input datum X(i) and from said second subsidiary datum r(j).

As for the first subsidiary datum s(j), this second subsidiary datum r(j) may be generated by a random process or, more advantageously from the point of view of facilitating technical implementation, by a pseudo-random process. In a preferred implementation, the various second subsidiary data r(j) generated for a given input datum X(i) are generated during the step 105' in such a manner as to be distinct from one another. Finally, in a variant, this second subsidiary datum r(j) is generated as a function of the input datum X(i), as explained below.

A second coding function Cx is then applied during the coding step 107' to the input datum X(i) and to the second subsidiary datum r(j) as generated during the step 105' in order to obtain a coded input datum x(i,j) satisfying x(i,j)=Cx(X(i),r(j)).

Thus, for each pair of variables (i,j), a coded input datum x(i,j) and an output datum y(i,j) are obtained at the end of the coding step 107'. For a given input datum X(i), n data pairs (x(i,j),y(i,j)) are thus calculated, with j varying over the range 1 to n.

Once both recursive loops have terminated, a set of pairs $\{(x(i,j),y(i,j))\}_{1 \leq i \leq m,\ 1 \leq j \leq n}$ is then available that can be stored during a storage step 113' in the form of a correspondence table T' in appropriate storage means.

Figure 2B:
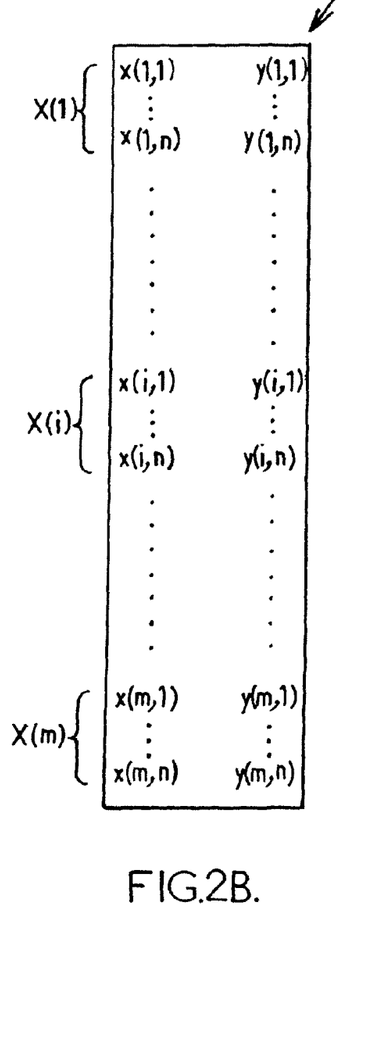
FIG. 2B shows the correspondence table generated by the first implementation of the generation method of the present invention.

FIG. 2B shows the correspondence table generated by such a first implementation of the generation method of the present invention.

In FIG. 2B, the correspondence table T' is still in the form of two columns and n*m rows, with the first column comprising, this time, the coded input data x(i,j), while the second column still comprises the output data y(i,j) as associated respectively with the coded input data x(i,j).

By way of example, the data may be classified by incrementing the first variable i and then by incrementing the second variable j, which enables the data pairs (x(i,j),y(i,j)) to be grouped as a function of the input datum X(i) used for generating them, as shown in FIG. 2B.

Preferably, the data are classified without any apparent order relative to i and j, so that an observer of the table cannot group together the data pairs (x(i,j),y(i,j)) as a function of the input datum X(i) used for generating them. In a preferred implementation, the data are classified by increasing value, or they are sorted in an arbitrary order, thereby making it easier subsequently to search for them in the table.

The correspondence table T' as generated in this way thus consists of a set of n*m coded data pairs (x(i,j),y(i,j)) and may thus be in the form of a table having two columns and n*m rows, each row of the table containing a data pair x(i,j) and y(i,j). This correspondence table may be stored in storage means of the non-rewritable ROM type.

In FIG. 2B, it can clearly be seen that for each input datum X(i), there exists a certain number of output data y(i,j) associated with a certain number of coded input data x(i,j). This implementation is advantageous in the sense that the table T' as generated no longer directly contains any input data X(i), but only coded data x(i,j) corresponding to each input datum.

A user attempting reverse engineering on a correspondence table T' then does not even have access to the input data X(i) to which the encryption function F is applied directly. This other implementation is better at withstanding an attempt at fraudulent deduction insofar as a user having access to the coded input data x(i,j) and the output data y(i,j) has no direct knowledge of the input datum X(i) or of the encrypted datum Y(i). That makes it that much more difficult to deduce the cryptographic function F used.

Figure 3:
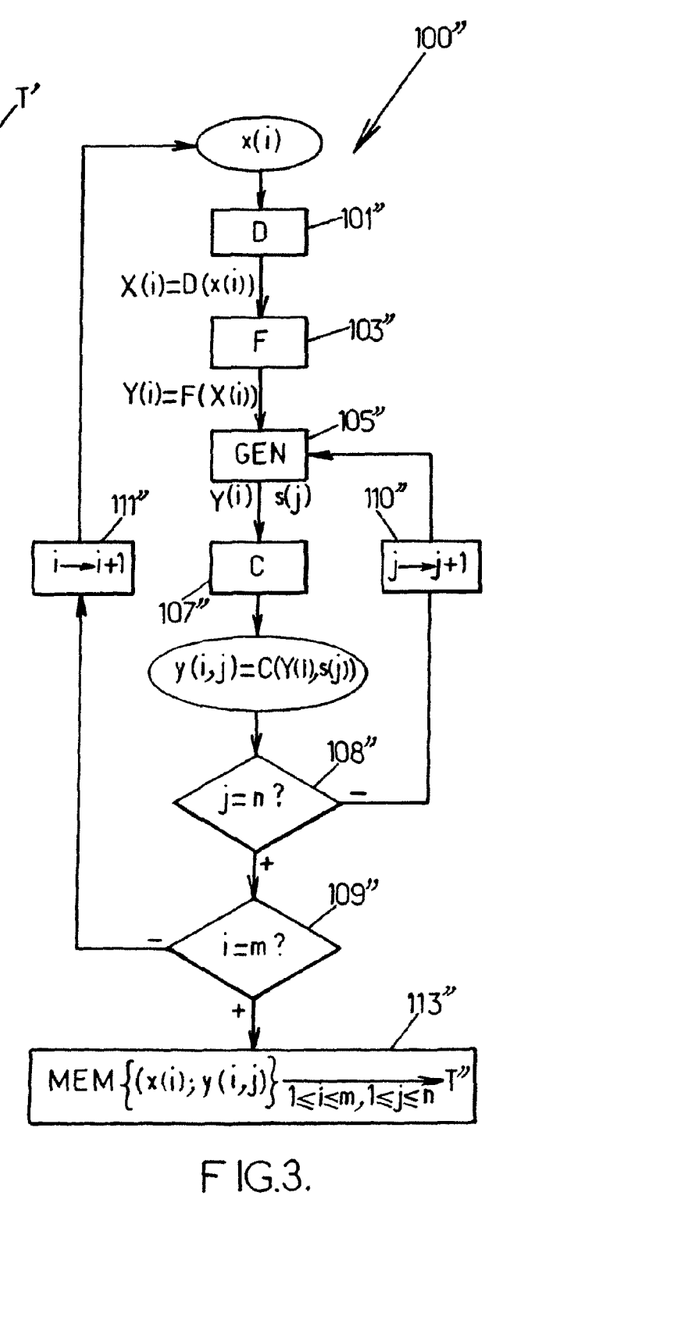
FIG. 3 shows a second implementation of the generation method of the present invention.

Reference is made below to FIG. 3 which shows a second implementation of the generation method of the present invention.

The steps of the method 100" shown in this figure correspond to the steps of the method 100 shown in FIG. 1A, except that the datum x(i) to which the method is applied is a precoded datum from the input data X(i) by means of prior coding function.

Under such circumstances, it is advantageous to begin by applying another preliminary function D to the precoded datum x(i) during a preliminary step 101". This other preliminary function D is preferably a function for decoding the prior coding function that is employed in order to obtain said datum x(i) from the input data X(i); this enables the encryption of step 103" actually to be applied to the input datum X(i) itself, and not to its precoded form.

This other implementation withstands a fraudulent deduction attempt insofar as a user having access to the precoded input data x(i) and the output data y(i,j) has no direct knowledge either of the input datum X(i) or of the encrypted datum Y(i). That makes it that much more difficult to deduce the cryptographic function F used.

This other implementation is particularly advantageous when the precoded input datum x(i) is itself obtained by prior application of another prior coding function $C_0$ to an initial input datum. Under such circumstances, preferably by selecting as the preliminary function used in the step 101 the decoding function $D_0$ that corresponds to said prior coding function $C_0$, it is possible to run a succession of cryptographic operations, while leaving only coded data observable.

This makes it possible to implement an overall encryption function in a cryptographic white box, which function is made up of a succession of n partial cryptographic operations, each represented by a correspondence table $T_k$ generated in accordance with the present invention and using coded transition variables that prevent the user from deducing each cryptographic operation individually, and thus a fortiori from deducing the overall encryption function.

Such an overall encryption function may therefore make use of a succession of n correspondence tables $T_1, \ldots, T_k, \ldots, T_n$ generated in accordance with the present invention, such that the output datum associated with an initial input datum in the first table $T_1$ constitutes an input datum for the second table $T_2$, which provides an associated output datum for the third table $T_3$, and so on until an output datum is obtained from the Nth table $T_N$ that corresponds finally to applying the overall encryption function to the initial input datum.

These correspondence tables $\{T_k\}_{1 \leq k \leq N}$ may then be used during decryption, in a cryptographic white box having these N tables.

Thus, in order to decrypt a datum encrypted by means of the above-described overall encryption function, it is necessary to find the input datum in the last correspondence table $T_N$ that corresponds to the output datum equivalent to the datum to be decrypted. This input datum from the last table $T_N$ constitutes an output datum for the last-but-one table $T_{N-1}$, which provides a corresponding input datum for the table $T_{N-1}$, and so on until the first table $T_1$ provides the input datum that corresponds finally to decrypting the encrypted datum.

Figure 4A:
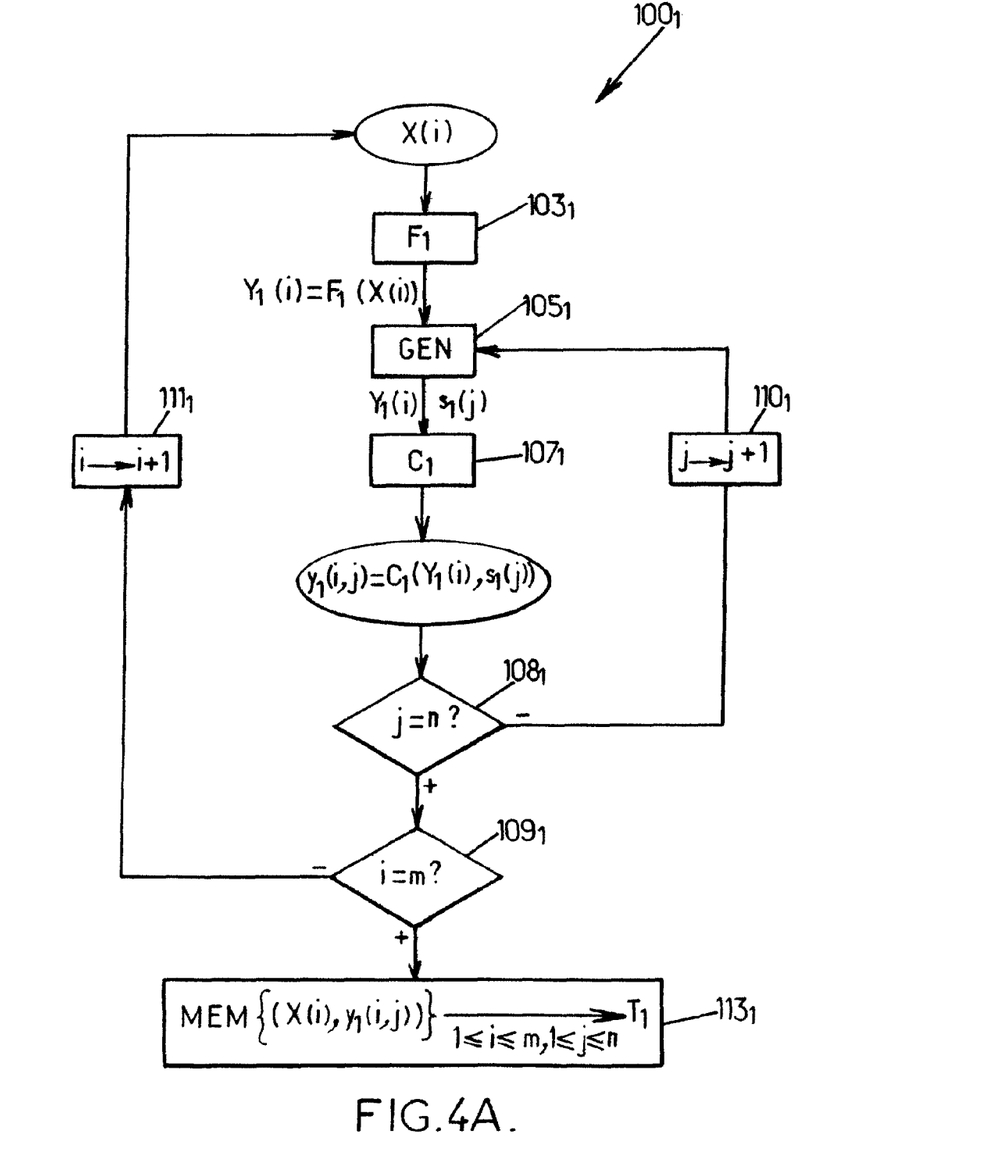
FIGS. 4A to 4C show a method of generating a plurality of correspondence tables in accordance with the present invention.
Figure 4B:
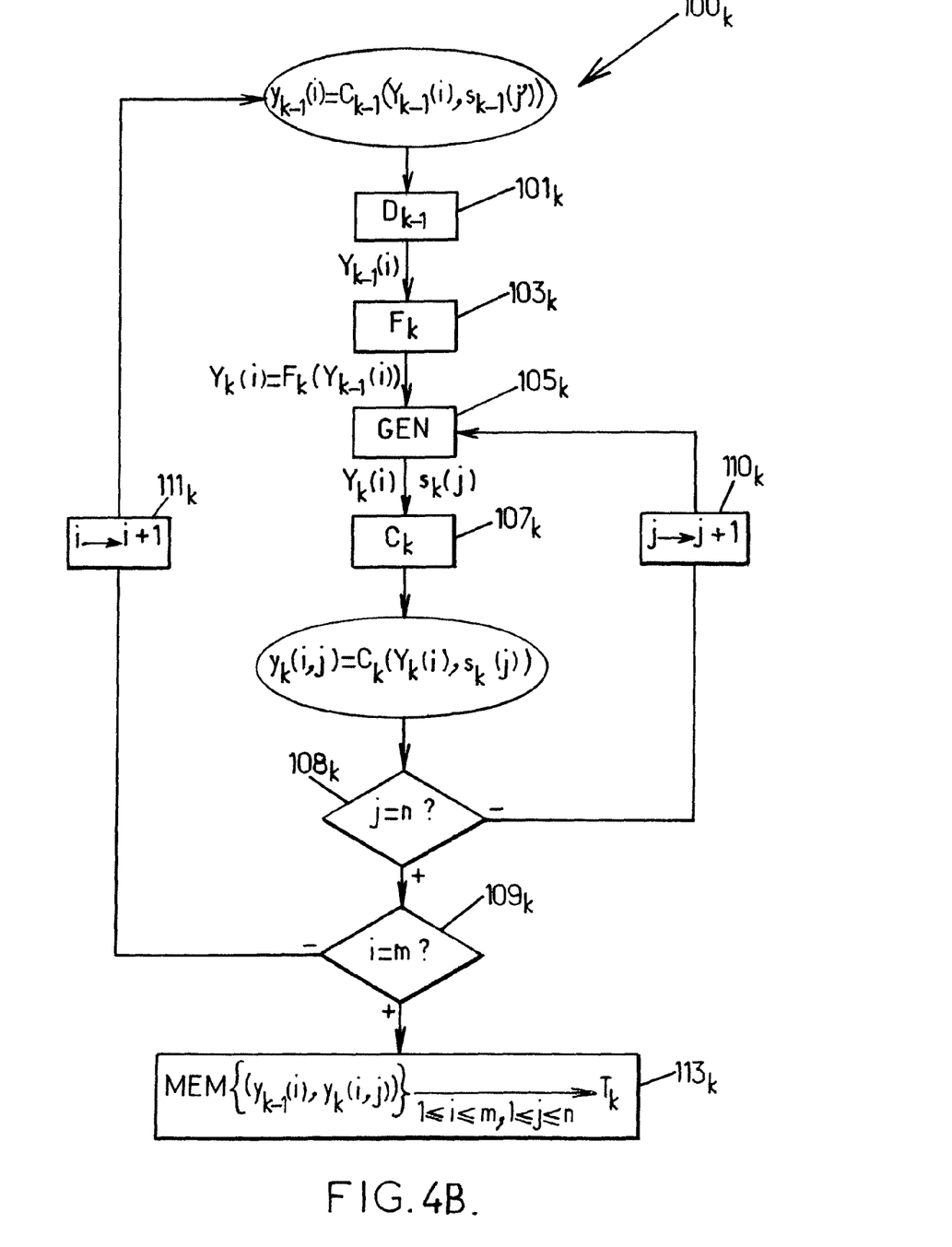
Figure 4C:
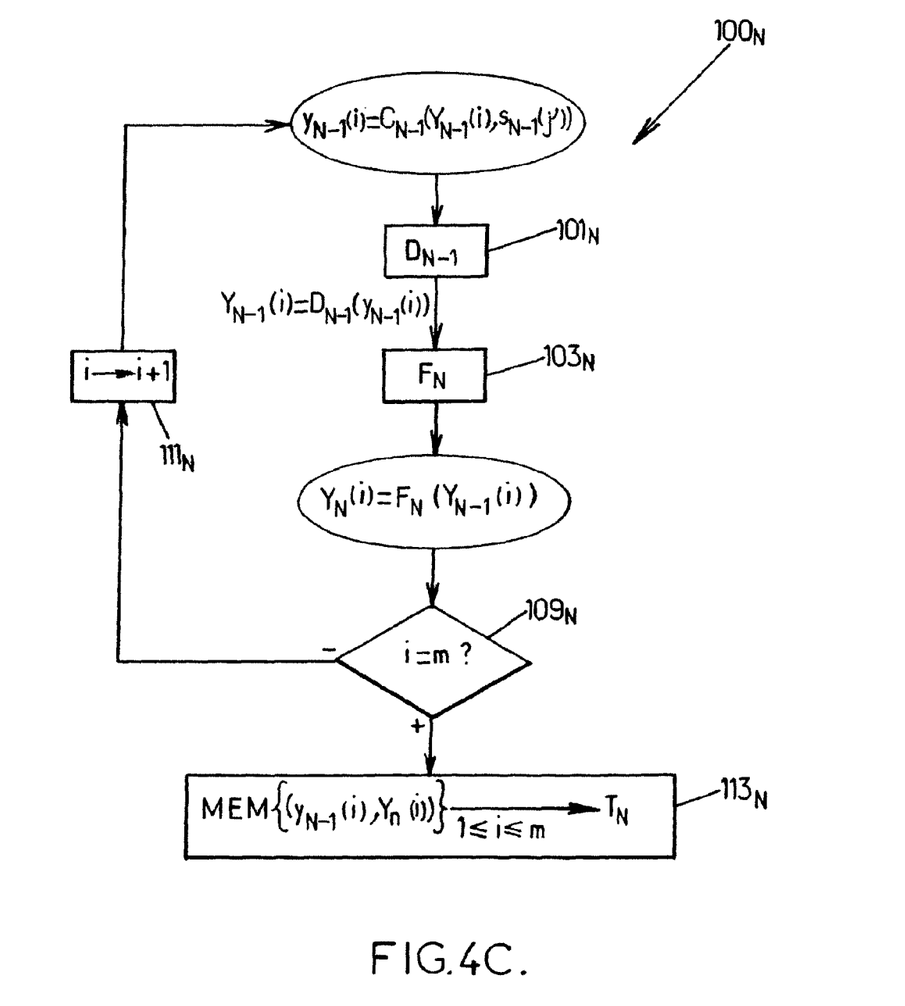

Reference is made below to FIGS. 4A to 4C which show a method of generating a plurality of n successive correspondence tables $\{T_k\}_{1 \leq k \leq N}$.

FIG. 4A shows the initial step $100_1$ of generating the first table $T_1$.

For each initial input datum X(i) under consideration, a cryptographic function $F_1$ is applied to said initial input datum $X_1(i)$ during a first partial encryption step $103_1$ so as to obtain an initial encrypted intermediate datum $Y_1(i)$.

An initial subsidiary datum $s_1(j)$ is also generated during a generation step $105_1$, e.g. in pseudo-random manner.

A coding step $107_1$ is then performed on the encrypted intermediate datum $Y_1(i)$ and also on the initial subsidiary datum $s_1(j)$ by using a coding function $C_1$ so as to obtain an output datum $y_1(i,j)$. This operation is repeated n times for initial subsidiary data $s_1(j)$ with j varying over the range 1 to n, for each initial input data X(i).

A set of n*m pairs of initial input data and associated output data $\{(X(i), y_1(i,j))\}_{1 \leq i \leq m, 1 \leq j \leq n}$ is thus calculated and forms the first correspondence table $T_1$, e.g. in the form of a 2*(m*n) matrix stored in appropriate storage means.

Following this initial step $100_1$, the generation method has a succession of steps $100_k$ of generating respective correspondence tables $T_k$ with k varying over the range 2 to N.

FIG. 4B shows the step $100_k$ following a preceding generation step $100_{k-1}$. The input data used in this step $100_k$ is known with certainty, as indeed are all of the output data $\{y_{k-1}(i)\}_{1 \leq i \leq m}$ obtained during the preceding step $100_{k-1}$. For each input datum $y_{k-1}(i)$ that corresponds to a transition variable between the table $T_{k-1}$ and the table $T_k$, the following steps are performed:

The initial encrypted intermediate datum $Y_{k-1}(i)$ obtained at the end of the encryption step $103_{k-1}$ of the preceding generation step $100_{k-1}$ is initially recovered in the decoding step $101_k$ by applying the decoding function $D_{k-1}$ corresponding to the coding function $C_{k-1}$ used during the coding step $105_{k-1}$ of the preceding generation step $100_{k-1}$.

A cryptographic function $F_k$ is then applied during the partial encryption step $103_k$ to said initial encrypted intermediate datum $Y_{k-1}(i)$ in order to obtain a new encrypted intermediate datum $Y_k(i)$.

This new encrypted intermediate datum $Y_k(i)$ corresponds to the initial input datum X(i) being encrypted by the composition of the cryptographic functions $F_0 \ldots F_k$. This composition is performed without giving any access to a user since the user can observe only the transient variables $y_k(i)$ which are themselves encoded as a function in particular of a subsidiary datum that may be pseudo-random. The composition of the cryptographic functions $F_0 \ldots F_k$ is thus protected.

A new subsidiary datum $s_k(j)$ is also generated during a generation step $105_k$, e.g. in pseudo-random manner. Nevertheless, in this generation step $105_k$, the new subsidiary datum $s_k(j)$ may also depend on the input datum $y_{k-1}(i)$, in particular the previously-generated subsidiary datum $s_{k-1}(j')$ as generated during the preceding generation step $100_{k-1}$, and that is recovered by the decoding step $101_k$.

In an advantageous implementation, the new subsidiary datum $s_k(j)$ is calculated from this old subsidiary datum $s_{k-1}(j')$, e.g. by applying a pseudo-random function or a function that guarantees that the new subsidiary datum differs from the old subsidiary datum, so as to facilitate generating the new subsidiary datum $s_k(j)$.

Once the new subsidiary datum $s_k(j)$ has been generated, a new coding function $C_k$ is used during the step $107_k$ for coding the new coded intermediate datum $Y_k(i)$ and the new subsidiary datum $s_k(j)$, so as to obtain the new output datum $y_k(i,j)$.

A set of n*m pairs of initial input data and of associated output data $\{(y_{k-1}(i), y_k(i,j))\}_{1 \leq i \leq m, 1 \leq j \leq n}$ is thus calculated and forms the correspondence table $T_k$, still for example in the form of a 2*(m*n) matrix stored in appropriate storage means.

The generation step $100_k$ is then repeated N−2 times up to a step $100_{N-1}$, in a manner similar to the step $100_k$, in order to obtain the correspondence tables $T_2$ to $T_{N-1}$. Each correspondence table $T_k$ therein is constituted by a set of m pairs of input data and of associated output data $\{(y_{k-1}(i), y_k(i,j))\}_{1 \leq i \leq n, 1 \leq j \leq n}$ calculated in the above-described manner.

After calculating the table $T_{N-1}$, the output data $y_{N-1}(i)$ are in a form that has been encoded by the last-used coding function $C_{N-1}$. In one implementation, it is then possible to generate a last correspondence table $T_N$ corresponding to decoding each datum $Y_{N-1}(i)$ as a datum $y_N(i)$ by means of the decoding function $D_{N-1}$ corresponding to the coding function $C_{N-1}$.

In so doing, the resulting decoded data is then equivalent to the most recent encrypted intermediate data $Y_{N-1}(i)$ coming directly from the cryptographic function $F_{N-1}$ thereby leaving the user the possibility of accessing that cryptographic function.

Another variant consists in generating the last correspondence table $T_N$ in the manner shown in FIG. 4C during a final table generation step $100_N$.

For each input datum $y_{N-1}(i)$, this final step $100_N$ comprises a first step $101_N$ of decoding this datum in order to obtain a new encrypted intermediate datum $y_{N-1}(i)$.

A last step $103_N$ of partial encryption is then performed using the cryptographic function $F_N$ in order to obtain a final output datum $Y_N(i)$. A set of m input and associated final output data pairs $\{(y_{N-1}(i), Y_n(i))\}_{1 \leq i \leq m}$ is thus calculated to form the last correspondence table $T_N$, e.g. still in the form of a m*2 matrix stored in appropriate storage means.

Such a final output datum $Y_N(i)$ then corresponds to the overall encryption of the initial input datum X(i) by means of the composition of the cryptographic functions $F_1, \ldots, F_N$.

Figure 5:
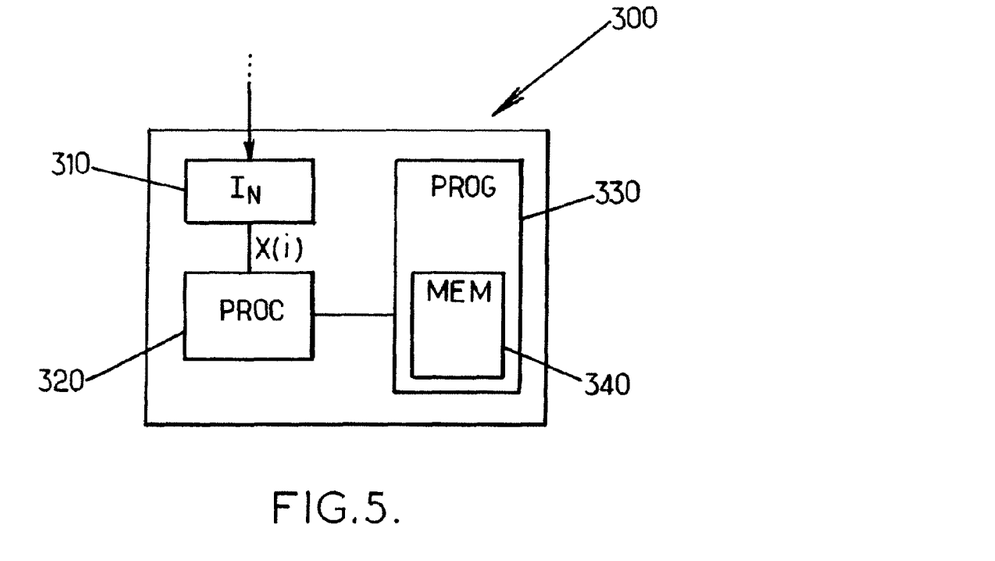
FIG. 5 shows a device for physically implementing a cryptographic correspondence table generated by means of the invention of the present invention.

Reference is made below to FIG. 5, which shows a device 300 for physically implementing a cryptographic correspondence table as described above.

Such a device 300 comprises input means 310 such as connection means for transferring data, which means are connected to a data processor unit 320. The data processor unit may be a processor, a microprocessor, or any type of component capable of performing calculations on data.

The device 300 also has a programmer unit 330 suitable for receiving at least one storage means 340 and connected to the data processor unit.

In particular, the memory means 340 that are to be received may be constituted by a ROM, in which it is possible to write data once only and that therefore operates in read only mode. Under such circumstances, the programmer unit 330 is a unit capable of programming such a read only memory.

The processor unit 320 is arranged firstly to receive a set of m input data X(i) and secondly to respond to each of these input data X(i) to generate output data y(i,j) by performing calculation, e.g. involving a single cryptographic function F.

The set of n*m input and output data pairs $\{(X(i),y(i,j))\, y(i,j))\}_{1 \le i \le m,\, 1 \le j \le n}$ as obtained in this way forms a correspondence table T corresponding to the cryptographic function F. The programmer unit 330 is then arranged to store said correspondence table in the storage means 340.

When the cryptographic function F is made up of N partial cryptographic functions $F_k$, the programmer unit 330 may store the N correspondence tables $T_1, \ldots, T_N$ corresponding to each of the functions $F_k$ one after another in N storage means $340_1, \ldots, 340_N$, each storage means $340_k$ being placed in turn in the programmer unit 330 in order to be programmed therein with the correspondence table $T_k$ that corresponds thereto. Such a programming method thus provides N separate storage means $340_1, \ldots, 340_N$, each containing a correspondence table $T_k$ associated with one of the partial cryptographic functions $F_k$.

A variant consists in programming the N correspondence tables $T_1, \ldots, T_N$. This may be performed with a programmer unit 330 arranged to receive a storage unit 340 having N storage means $340_1, \ldots, 340_N$. The programmer unit 330 may then program each of the storage means $340_k$ of the storage unit with the correspondence table $T_k$ that corresponds thereto, and this programming may be performed in parallel. Such a method thus provides a storage unit 340 having stored therein all of the correspondence tables $T_1, \ldots, T_N$. The storage unit 340 is thus associated with the overall cryptographic function F. This method presents the advantage of providing a storage unit that is potentially more compact and of enabling physical implementation to be performed more quickly by making use of calculations performed in parallel.

Figure 6:
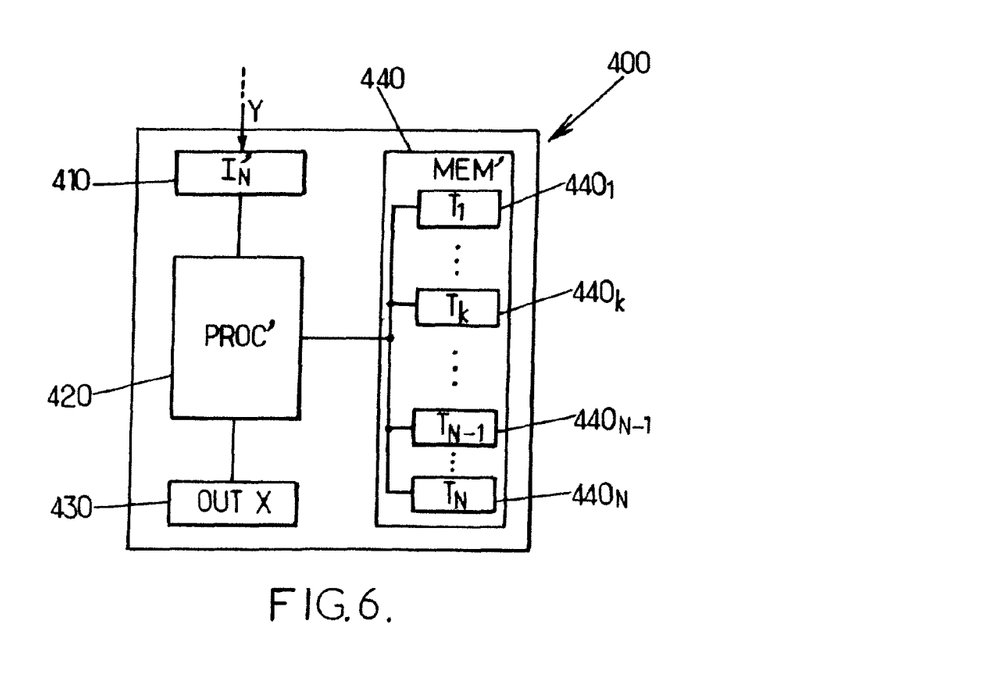
FIG. 6 shows a cryptographic decryption device using at least one correspondence table generated by means of the method of the present invention.

Reference is made below to FIG. 6 which shows a cryptographic decryption device 400 making use of at least one correspondence table generated by means of the method of the present invention.

Such a decryption device 400 may be used in any system that receives encrypted multimedia data, such as a set-top box that receives encrypted programs such as movies, readers of physical audio media such as compact disks (CDs) or optical disks, readers of physical video media such as digital video disks (DVDs), or indeed security modules of the dongle or smart card type, for example, suitable for decrypting a received message that is encrypted.

The decryption device 400 comprises firstly data receiver means 410 capable of receiving an encrypted datum Y, such as for example connection means for wired or wireless data transfer.

In order to be able to decrypt such an encrypted datum Y, the decryption device further comprises a storage unit 440 having n storage means $440_1, \ldots, 440_N$ in which there are stored respectively N correspondence tables $T_1, \ldots, T_N$ generated by the generation method described above and in which the functions $F_k$ have been used.

Such a storage unit 440 may be fabricated using the above-described physical implementation device 300 and it may be stored in the device 400 before that device is marketed. Such a storage unit 440 may also be programmed remotely, by downloading the various correspondence tables $T_1, \ldots, T_N$ into a storage unit that comprises N storage means $440_1, \ldots, 440_N$, or that is suitable for being subdivided into such means.

The device 400 also comprises a processor unit 420 capable of receiving the datum Y for decrypting, and of making use in succession of the various storage means $440_1, \ldots, 440_N$ for decrypting Y. In order to do this, the processor unit 420 performs a process that is the inverse of that performed for deducing the datum Y from the initial datum X during encryption. More precisely:

during an initial first step of partial decryption, the processor unit 420 accesses the last-generated storage means $440_N$ in order to search the correspondence table $T_N$ corresponding to the last function $F_N$ making up the function F, and find therein the input datum $Y_{N-1}$ corresponding to the datum Y for decryption, which is taken as the output datum in said table $T_N$;

thereafter the processor unit 420 accesses each of the storage means $440_k$ that have been generated in succession in decreasing order in order to search the correspondence table $T_k$ corresponding to the function $F_k$ making up part of F, and find therein the input datum $Y_{k-1}$ corresponding to the datum $Y_k$ taken as the output datum in said table $T_k$, the datum $Y_k$ having itself been obtained in that way, and so on down to the second storage means $440_2$ having the second correspondence table $T_2$ stored therein corresponding to the second partial function $F_2$; and the processor unit 420 then terminates by accessing the first storage means $440_1$ having stored therein the first correspondence table $T_1$. By using the last input datum $Y_1$ obtained from the preceding table $T_2$ as an output datum for the table $T_1$, the associated input datum will be found to be the initial datum X.

These successive steps amount to finding the initial datum X by applying the formula:

$$X = F^{-1}(Y) = F_n^{-1} \circ \ldots \circ F_1^{-1}(Y)$$

Once the initial datum X has been found, it may be read, listened to, viewed, or transmitted by the output means 430.

The decryption device 400 constitutes a white box in the cryptographic meaning of the term, i.e. it is indeed possible that its user might gain access to the transient variables used between each of the storage means $440_k$ (e.g. by monitoring the data passing over the bus connecting the processor 420 with the storage unit 440), but can under no circumstances deduce therefrom information about the partial cryptographic functions $F_k$ used for encrypting the datum Y.

These functions $F_k$, even though they are virtually present in the device 400 via the correspondence tables $T_k$, remain inaccessible to the user, and they thus remain protected from the user.

The above-described steps of the method of generating correspondence tables may be implemented by means of a computer program, e.g. used in the above-described processor unit 320. Consequently, the invention also provides a program suitable for being executed by a computer or by a data processor, the program including instructions for controlling the execution of the steps of a generation method as described above.

The program may use any programming language, and may be in the form of source code, object code, or code that is intermediate between source code and object code, such as a partially compiled form, or in any other desirable form.

The invention also provides a data medium that is readable by a computer or a data processor and that includes the instructions of a program as mentioned above.

The data medium may be any entity or device capable of storing the program. For example, the medium may comprise storage means such as a ROM, e.g. a CD ROM, or a microelectronic circuit ROM, or indeed magnetic recording means, e.g. a floppy disk or a hard disk.

Furthermore, the data medium may be a transmissible medium such as an electrical or optical signal that may be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or be used in the execution of the method in question.

Naturally, the invention is not limited to the implementations described and shown above, and other implementations and embodiments may be deduced therefrom without thereby going beyond the ambit of the present invention.

Thus, having recourse to successive correspondence tables $T_k$ is described above with reference to FIGS. 4A to 4C. Nevertheless, the invention is not limited to such a "linear" use of those tables, but is equally applicable to making use of them in a mesh network or calling on them both sequentially and in parallel.

Furthermore, the input datum X(i) of a table T may be constituted by one or more data output from preceding tables, e.g. by a concatenation of those output data, with the coding used then corresponding between data.

Thus, in the example of combining the outputs of two tables $T_1$ and $T_2$ for input to a table $T_3$, the output data $y_1$ and $y_2$ are obtained as outputs form the tables $T_1$ and $T_2$ respectively, where $y_1 = C_1(Y_1, s_1)$ and $y_2 = C_2(Y_2, s_2)$, based on respective input data $Y_1$ and $Y_2$ and on respective subsidiary data $s_1$ and $s_2$.

The table $T_3$ may then take as input a datum $Y_3$ such that $Y_3 = Y_1 \| Y_2$, where $\|$ is the concatenation symbol, with this being possible with a subsidiary datum $s_3 = s_1 \| s_2$ and with a coding function $C_3$ such that $$C_3(Y_3, s_3) = C_1(Y_1, s_1) \| C_2(Y_2, s_2)$$

The invention claimed is:

1. A method of generating a correspondence table suitable for use in a cryptographic processing method and comprising:
   storing a plurality of input data and of output data in the table;
   associating each said input datum with a plurality of said output data in the table;
   for each said input datum, generating, using a processor of a computer, a plurality of distinct first subsidiary data and a plurality of distinct second subsidiary data, and obtaining an encrypted intermediate datum depending on the input datum;
   for each said generated first subsidiary datum, obtaining the plurality of output data by applying, with the processor, a coding function to said first subsidiary datum and to the encrypted intermediate datum depending on the input datum; and
   for each of said generated second subsidiary data, obtaining a plurality of coded input data by applying, with the processor, a further coding function to said second subsidiary datum and to the input datum.

2. The method of generating a correspondence table according to claim 1, wherein the encrypted intermediate datum is obtained by applying a cryptographic function to the input datum.

3. A method of generating a correspondence table suitable for use in a cryptographic processing method according to claim 2, wherein the correspondence table establishes a correspondence so that a coded input datum, obtained by applying the further coding function to a particular input datum corresponds to a coded encrypted intermediate datum obtained by applying the coding function to the application of the cryptographic function to the particular input datum.

4. A method of generating a correspondence table suitable for use in a cryptographic processing method according to claim 3, wherein the correspondence table establishes a correspondence so that a coded input datum, obtained by applying the further coding function to a particular input datum and particular second subsidiary datum corresponds to the coded encrypted intermediate datum obtained by applying the coding function to the applications of the cryptographic function to the particular input datum and the subsidiary function to the particular second subsidiary datum.

5. The method of generating a correspondence table according to claim 1, wherein at least one of the first subsidiary data and the second subsidiary data are generated randomly.

6. The method of generating a correspondence table according to claim 1, wherein the input datum is obtained by applying a preliminary function to a precoded input datum.

7. The method of generating a correspondence table according to claim 6, wherein the precoded input datum is obtained by prior application of a prior coding function to at least one prior encrypted intermediate datum, wherein the preliminary function that is applied to the prior input datum is a decoding function corresponding to said prior coding function.

8. A method of generating a plurality of correspondence tables by initially generating a first correspondence table using the method according to claim 1, followed by generating a succession of correspondence tables by way of a method of generating a correspondence table, wherein the precoded input datum is obtained by prior application of a prior coding function to at least one prior encrypted intermediate datum, wherein the preliminary function that is applied to the prior input datum is a decoding function corresponding to said prior coding function.

9. The method of generating a plurality of correspondence tables according to claim 8, wherein the final generation of a last correspondence table having a plurality of input data stored therein, each associated with a plurality of output data, each said output datum being obtained by applying a cryptographic function to an intermediate datum obtained by application to the associated input datum of a decoding function corresponding to the coding function used while generating the last table generated during the method according to claim 8.

10. A storage unit comprising at least one storage element having stored therein a first plurality of input data and a second plurality of output data, wherein, for each storage element, each input datum is associated with at least one said output datum in a correspondence table generated by way of a generation method according to claim 1.

11. A decryption device for decrypting an encrypted datum, the device comprising the storage unit according to claim 10, and a processor module connected to each of the storage element of the storage unit, said processor unit being arranged to read a first input datum associated with the data for decrypting from the storage element in which the last-generated table is stored and for reading the tables stored successively in the storage element successively in the opposite order to the order in which they were generated, to obtain an input datum associated with the output datum corresponding to the input datum read from the previously-read storage element.

12. A physical device for implementing a cryptographic correspondence table, the device comprising a data processor unit connected to a programmer unit suitable for receiving at least one memory element, wherein the processor unit is arranged to generate from a plurality of input data at least one cryptographic correspondence table by way of the method according to claim 1, the programmer unit being arranged to store said correspondence table in the storage element.

13. A non-transitory computer program product recorded in a storage medium for execution by a processor unit, wherein during execution by the computer it enables the generation method according to claim 1 to be implemented so as to obtain at least one cryptographic correspondence table.

14. A method of generating a correspondence table suitable for use in a cryptographic processing method according to claim 1, wherein the plurality of distinct first subsidiary data is calculated from the plurality of second subsidiary data by applying a subsidiary function to each of the second subsidiary datum.

15. A cryptographic processing device comprising
  a storage unit storing multiple correspondence tables, and
  a processor unit arranged to receive a datum and to cryptographically process the datum using the multiple correspondence tables, the multiple correspondence tables being obtained by:
  storing a plurality of input data and of output data in the table;
  associating each said input datum with a plurality of said output data in the table;
  for each said input datum, generating, using a processor of a computer, a plurality of distinct first subsidiary data and a plurality of distinct second subsidiary data, and obtaining an encrypted intermediate datum depending on the input datum;
  for each said generated first subsidiary datum, obtaining the plurality of output data by applying, with the processor, a coding function to said first subsidiary datum and to the encrypted intermediate datum depending on the input datum and obtaining an encrypted intermediate datum depending on the input datum; and
  for each of said generated second subsidiary data, obtaining a plurality of coded input data by applying, with the processor, a further coding function to said second subsidiary datum and to the input datum.

16. A non-transitory tangible computer readable storage medium comprising data representing multiple correspondence tables, the multiple correspondence tables being obtained by:
  storing a plurality of input data and of output data in the table;
  associating each said input datum with a plurality of said output data in the table;
  for each said input datum, generating, using a processor of a computer, a plurality of distinct first subsidiary data and a plurality of distinct second subsidiary data, and obtaining an encrypted intermediate datum depending on the input datum;
  for each said generated first subsidiary datum, obtaining the plurality of output data by applying, with the processor, a coding function to said first subsidiary datum and to the encrypted intermediate datum depending on the input datum and obtaining an encrypted intermediate datum depending on the input datum; and
  for each of said generated second subsidiary data, obtaining a plurality of coded input data by applying, with the processor, a further coding function to said second subsidiary datum and to the input datum.

17. A non-transitory tangible computer readable storage medium as in claim 16 further comprising data representing instructions executable by a programmable apparatus, said instructions being arranged to receive a datum and to cryptographically process the datum using the multiple correspondence tables.

18. A method of encrypting an input datum into an output datum, said method comprising:
  storing, in a storage unit, at least one correspondence table; and
  receiving an input datum and cryptographically processing the input datum using the correspondence table to form the output data,
wherein the correspondence table is obtained by:
  storing a plurality of input data and of output data in the correspondence table;
  associating each of said plurality of input data with a plurality of said output data in the correspondence table;
  for each of said stored input datum, generating, using a processor, a plurality of distinct first subsidiary data and a plurality of distinct second subsidiary data, and obtaining an encrypted intermediate datum depending on the input datum;
  for each said generated first subsidiary datum, obtaining the plurality of output data by applying, with the processor, a coding function to said first subsidiary datum and to the encrypted intermediate datum depending on the input datum and obtaining an encrypted intermediate datum depending on the input datum; and
  for each of said generated second subsidiary data, obtaining a plurality of coded input data by applying, with the processor, a further coding function to said second subsidiary datum and to the input datum.

19. The method of encrypting an input datum into an output datum according to claim 18, wherein a prior step of storing a plurality of subsidiary data used for generating at least one correspondence table, the first subsidiary datum being selected randomly from said plurality of subsidiary data.

* * * * *